April 1, 1952 J. H. STEES 2,591,312
EXTENSIBLE DRAFT TONGUE FOR TRAILERS AND THE LIKE
Filed Nov. 6, 1950 2 SHEETS—SHEET 1

Joseph H. Stees
INVENTOR.

BY *Clarence A. O'Brien*
*and Harvey B. Jacobson*
Attorneys

April 1, 1952 J. H. STEES 2,591,312
EXTENSIBLE DRAFT TONGUE FOR TRAILERS AND THE LIKE
Filed Nov. 6, 1950 2 SHEETS—SHEET 2
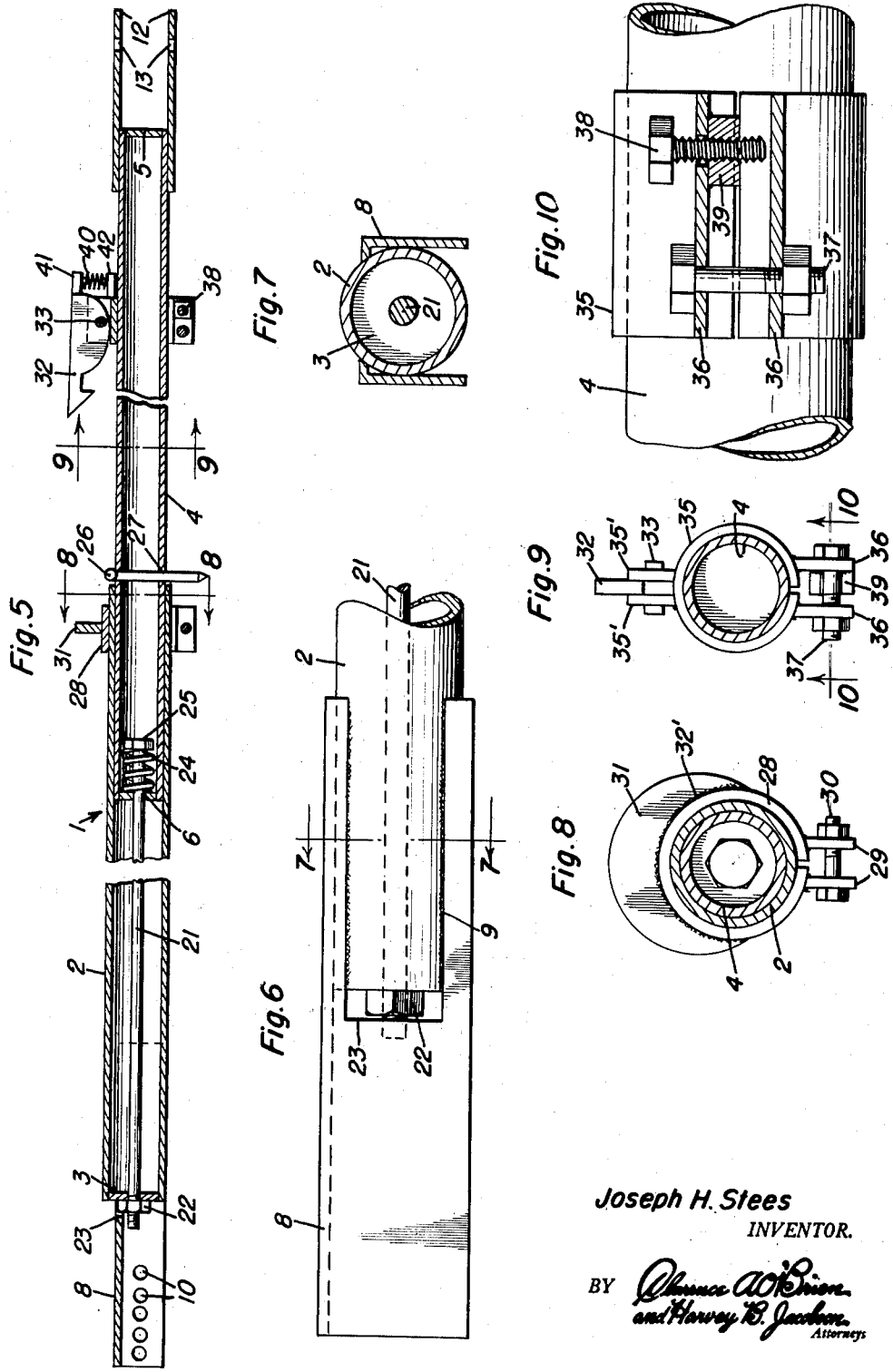
Joseph H. Stees
INVENTOR.
BY Patented Apr. 1, 1952

2,591,312

UNITED STATES PATENT OFFICE 2,591,312

EXTENSIBLE DRAFT TONGUE FOR TRAILERS AND THE LIKE

Joseph H. Stees, Freeport, Ill.

Application November 6, 1950, Serial No. 194,327

3 Claims. (Cl. 287—58)

My invention relates to improvements in extensible draft tongues for coupling trailer vehicles to draft vehicles, and especially farm wagons to tractors.

The primary object of my invention is to provide a telescopic trailer tongue extensible to couple a trailer farm wagon to a tractor while both vehicles are standing and which is adapted to be contracted for draft purposes to a predetermined length and for locking in contracted positions by backing the tractor relative to the farm wagon.

Another object is to provide telescopic extensible draft tongue adapted to be extended and contracted by relative forward and reverse movement, respectively, of a loading draft vehicle and a farm wagon alongside each other, whereby to facilitate loading of a farm wagon from one end to the other from the loading vehicle.

Still another object is to provide a telescopic tongue for the above purposes, which is simple in construction, inexpensive to manufacture and adapted for pulling heavy loads safely.

Other and subordinate objects within the purview of my invention, together with the precise nature of my improvements, will be readily understood when the succeeding description and claims are read with reference to the drawings accompanying and forming part of this specification.

In said drawings:

Figure 5 is a view in vertical longitudinal section, partly broken away, of the tongue extended and unlocked, and drawn to a further enlarged scale;

Figure 6 is a fragmentary view in plan of the rear end of the tongue drawn to a still larger scale;

Figure 7 is a view in transverse section taken on the line 7—7 of Figure 6;

Figure 8 is a similar view taken on the line 8—8 of Figure 5 and drawn to a larger scale;

Figure 9 is a similar view taken on the line 9—9 of Figure 5; and

Figure 10 is a fragmentary view in horizontal section taken on the line 10—10 of Figure 9 and drawn to a larger scale.

Figure 1:
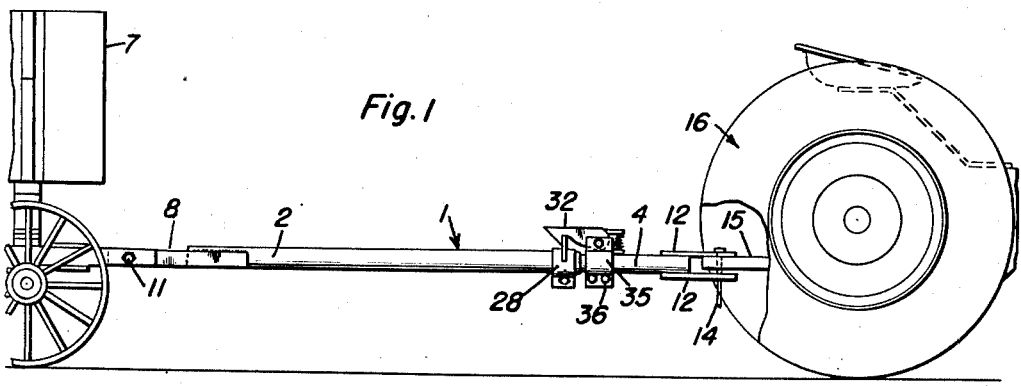
Figure 1 is a fragmentary view in side elevation illustrating my improved draft tongue coupling a tractor to a farm wagon and with the tongue contracted to a predetermined length and locked in contracted position for draft purposes.
Figure 2:
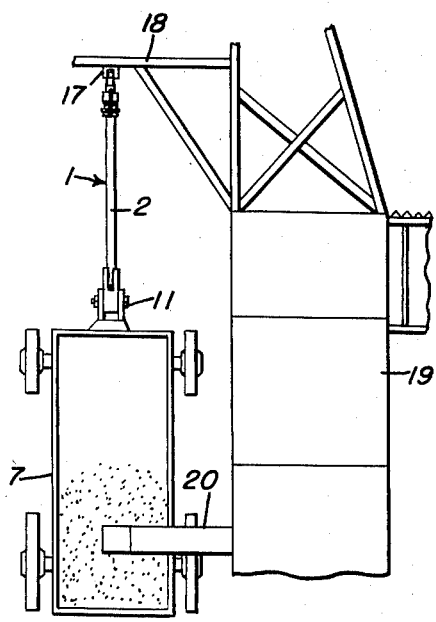
Figure 2 is a fragmentary view in plan, drawn to a smaller scale, and illustrating my improved tongue coupling a farm wagon to a combine harvester alongside the same, the tongue being contracted to position the farm wagon for loading at its rear end from the combine harvester.
Figure 3:
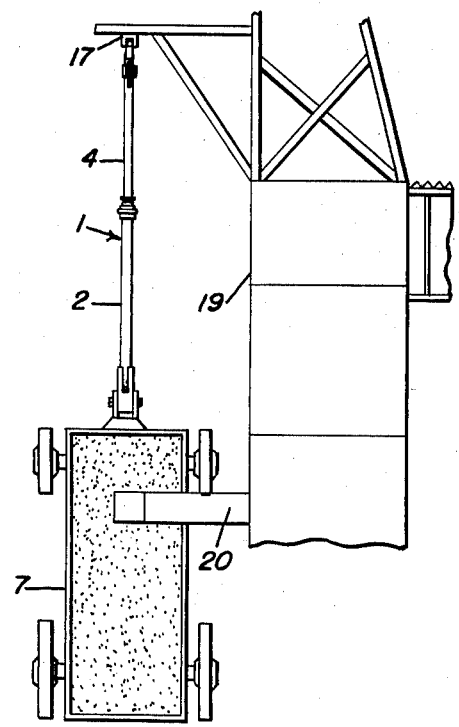
Figure 3 is a similar view illustrating the tongue extended for loading of the wagon at its front end from the combine harvester.
Figure 4:
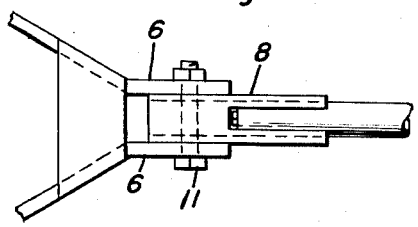
Figure 4 is a fragmentary view in plan drawn to a larger scale and illustrating the means for coupling the rear end of the tongue to the hounds of the farm wagon.

Referring to the drawings by numerals, according to my invention, as illustrated, a draft tongue, designated as a unit by the numeral 1, is provided comprising a rear hollow cylindrical section 2 having a closed rear end 3, and a front hollow cylindrical section 4 having a closed front end 5 and a closure disk 6 suitably fixed, as by welding, not shown, in its rear end. The front section 4 slidably fits in the rear section 2 and extends out of the front end thereof so that said sections are telescopically arranged to extend and contract the length of said tongue. The sections 2 and 4 are preferably formed of steel. As will be clear, said sections 2 and 4 are relatively rotatable.

A wagon attaching member extends rearwardly of the rear end portion of the rear section 2 for connecting the tongue 1 between the hounds 6 of a farm wagon 7, said member having the form of a bifurcated channel beam 8 straddling said section 2 and welded to the sides thereof, as at 9. Side openings, as at 10, in the beam 8 provide for extending the usual pivot bolt 11 in the hounds 7 through said beam 8 at selected points along the beam, as may be required by the length of the hounds and location of said bolt, and whereby said tongue is pivoted to said hounds 6 for vertical swinging thereon.

A pair of upper and lower coupling plates 12 are suitably fixed to the front end portion of the front section 4 to extend forwardly therefrom with coaxial bolt holes 13 therein and for attaching by a coupling pin 14 in straddling relation to the usual rear draft bar 15 of a tractor 16, or to a draft lug 17 on a side structure 18 of a combine harvester 19, or other loading vehicle, provided with a side discharge chute 20.

Extension of the tongue 1 into its fully extended position of maximum length is limited by a stop rod 21 in the rear and front sections 2, 4, said rod extending through the rear end 3 of section 2 and slidably extending through the closure disk 6 of the front section 4. A nut 22 on the rear end of the stop rod 21, back of said rear end 3, and extending into a slot 23 in the channel beam 8 prevents end play of said rod. A coil spring 24 in front of the closure disk 6 between the same and a front end head 25 on said rod 21 cushions extension of the front section 4 and yieldingly limits extension thereof when the tongue 1 is fully extended to its maximum length.

A pin 26 for insertion in vertically aligned openings 27 in the front section 4, when the tongue 1 is extended substantially fully, is adapted to engage the front end of the rear section 2 and thus lock the front section 4 against retraction and the rear section 2 against overriding the front section 4 forwardly.

Means are provided for locking the rear and front sections 2, 4 against telescopic movement in selected, partly extended positions of the tongue 1 and comprising the following: A split collar 28 is clamped around the rear section 2 by depending ears 29 on said collar and a bolt traversing said ears, said collar being slidably settable around said section 2 to correspondingly set a crescent shaped eccentric flange 31 straddling said collar circumferentially on top thereof and welded thereto, as at 32'. A vertically rockable hooked locking dog 32 on top of the front section 4 is pivoted, as at 33, for vertical rocking movement between upstanding top ears 35' on a resilient split collar 35 which, like the collar 28, is clamped to the front section 4 by depending ears 36 on the collar and a bolt 37 traversing the ears 36. A collar spreading bolt 38 extends through one ear 36 of said collar 35 and through a nut 39 welded onto said ear for turning of said bolt against the other ear 36 to spread said collar 35 so that it may be easily set along said section 4 to correspondingly set the locking dog 32 for a purpose presently seen. A coil spring 40, between a tail lug 41 on the locking dog 32 and a lug 42 on said collar 35, tensions said dog to snap over the flange 31 into locking engagement with said flange.

The operation and use of the described tongue will now be set forth. By setting the collar 35 selectively along the front section 4 and contracting the tongue 1, the locking dog 32 may be caused to snap over the flange 31 to lock said tongue in a selected extended position. To couple the wagon 7 to the tractor 16, the front section 4 is rotated in the rear section 2 to rotate the locking dog relative to the flange 31 so that the locking dog 32 is positioned below said flange and slides off the same. Thus, the sections 2 and 4 are unlocked. With the tractor 16 backed within reach by the tongue 1, the front section 4 is extended until the coupling plate 12 may be attached to the draft bar 15. At this point, the front section 4 is rotated to bring the locking dog 32 uppermost and the plate 12 then attached to said draft bar. Now, by further backing the tractor 16, the front section 4 will be slid into the rear section 2 until the locking dog 32 snaps over the flange 31 and locks the sections 2, 4 together, and the tongue in selected extended position for pulling the wagon 7. Optionally, after attaching the coupling plates 12, the tractor 16 may be driven forwardly to fully extend the tongue 1 and then slowed down or stopped to permit the wagon 7, under its momentum, to run forwardly independently until the locking dog 32 snaps over the flange 1 and locks the sections 2, 4 together. In loading the wagon 7 at the side of the combine harvester 19, the tongue 1 is contracted and attached to the draft lug 17 until the chute 20 discharges into the rear end of the wagon, it being understood that the sections 2 and 4 are locked, in the manner above described, in properly contracted position. When the rear end of the wagon 7 is loaded, the locking dog 32 is manually released from the flange 31 and the tongue 1 fully extended by driving the combine harvester 19 forwardly of the wagon 7 so that the chute 20 will discharge into the front end of the wagon 7. With the tongue 1 thus fully extended, the pin 26 is inserted in the openings 27 to lock the tongue against retraction in a manner which will be clear and prevent the wagon from running forwardly of the combine harvester 19 out of front end loading position.

The foregoing will, it is believed, suffice to impart a clear understanding of my invention without further explanation.

Manifestly, the invention, as described, is susceptible of modification, without departing from the inventive concept, and right is herein reserved to such modifications as fall within the scope of the appended claims.

Having described the invention, what is claimed as new is:

1. A draft tongue for a vehicle comprising a rear tubular section, a front section slidable endwise in said rear section for extension and retraction relative thereto to vary the length of the tongue and being rotatable in said rear section, and means to lock said front section to the rear section against extension comprising devices on said sections, respectively, co-engaging with a snap action upon retraction of said front section from an extended position, one of said devices being rotatable relative to the other by rotation of said front section whereby to disengage said devices and unlock said front section, one of said devices comprising a segmental flange on one section, and the other device comprising a spring-pressed dog on the other section for hooking over said flange.

2. A draft tongue for a vehicle comprising a rear tubular section, a front section slidable endwise in said rear section for extension and retraction relative thereto to vary the length of the tongue and being rotatable in said rear section, and means to lock said front section to the rear section against extension comprising devices on said sections, respectively, co-engaging with a snap action upon retraction of said front section from an extended position, one of said devices being rotatable relative to the other by rotation of said front section whereby to disengage said devices and unlock said front section, one of said devices being provided with means slidably mounting the same on its section for setting along its section to engage the other device in different extended positions of the front section.

3. A draft tongue for a vehicle comprising a rear tubular section having a closed rear end, a tubular front section slidable endwise outwardly of said rear section to vary the length of the tongue and having a closed rear end, means to yieldingly limit sliding of said front section outwardly of said rear section comprising a stop rod in said rear section slidably extending into the front section through the rear end of said front section, means on said rod abutting the rear end of the rear section to prevent forward movement of said rod relative to said sections, a head on said rod in said front section, and a coil spring on said rod between said head and the rear end of said front section for compression in the limit of extension of said front section, said front section being provided with aligned apertures therein, and a pin for insertion through said apertures to engage the front end of the rear section and prevent retraction of the front section by said spring in the limit of extension of said front section.

JOSEPH H. STEES.

REFERENCES CITED

The following references are of record in the file of this patent:

UNITED STATES PATENTS

| Number | Name | Date |
|---|---|---|
| 2,417,646 | Hallner | Mar. 18, 1947 |